Aug. 10, 1954  S. G. JOHNSON ET AL  2,686,061
TANDEM AXLE SPRING SUSPENSION SYSTEM
Filed Sept. 29, 1950  2 Sheets-Sheet 1
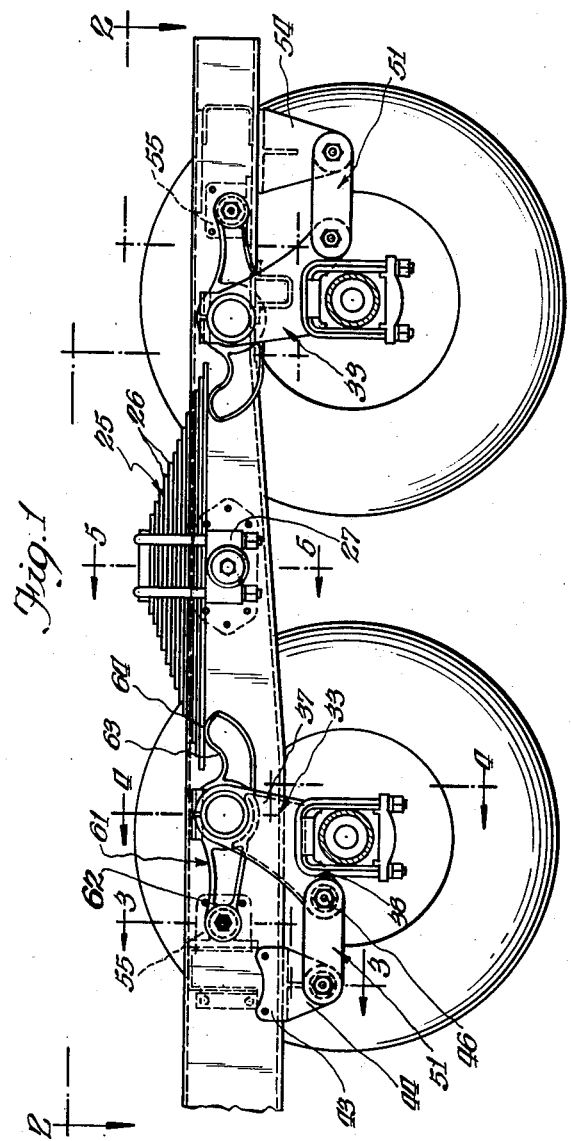
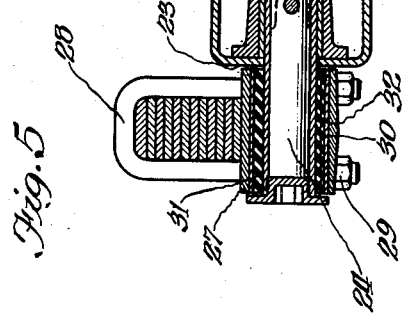
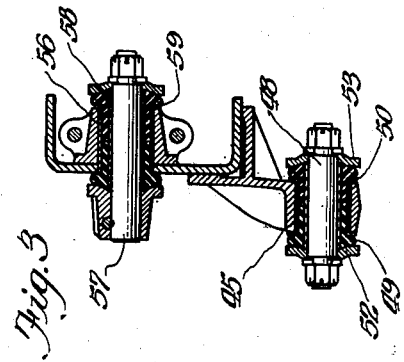
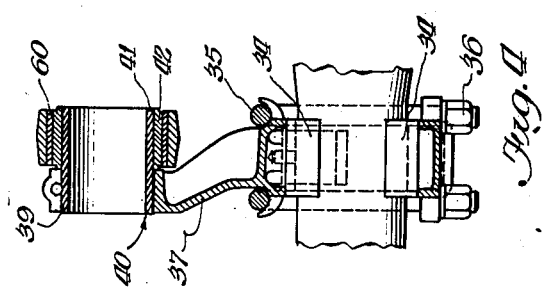
Inventors:
Samuel G. Johnson
Joseph A. Hausmann
By: Paul O. Pippel
Attorney.

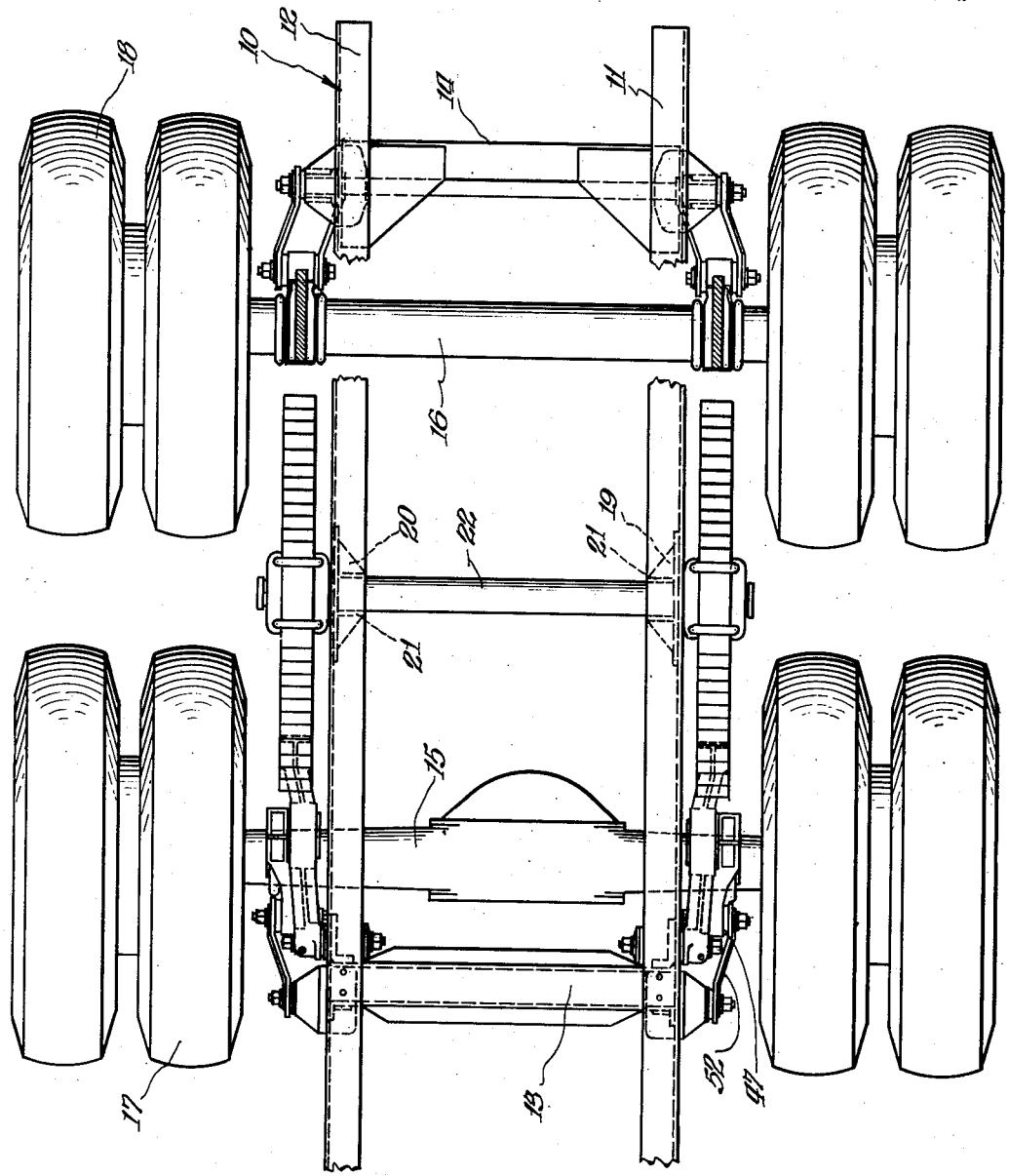

Patented Aug. 10, 1954

2,686,061

UNITED STATES PATENT OFFICE 2,686,061

TANDEM AXLE SPRING SUSPENSION SYSTEM

Samuel G. Johnson and Joseph A. Hausmann, Fort Wayne, Ind., assignors to International Harvester Company, a corporation of New Jersey Application September 29, 1950, Serial No. 187,498

10 Claims. (Cl. 280—104.5)

The present invention relates to automotive vehicles and more particularly to a new and improved axle suspension system for tandem axle vehicles.

The primary objective of the present invention is to provide an extremely rugged and durably tandem axle suspension system which has relatively few parts so as to be more quickly and easily assembled and disassembled and less expensive to manufacture than axle suspension systems heretofore known.

A further object is the provision of an axle suspension system in which each axle end is provided with a novel differential load-receiving member for receiving predetermined portions of the frame load from a primary and a secondary load-transmitting member.

Another object is the provision of a resilient secondary load-transmitting member for dividing the frame load received thereby equally to the differential load-receiving members associated therewith.

Still another object is to provide an axle suspension system in which the frame load is transmitted to the axles from a plurality of spaced points along the frame, thus distributing the load over a greater area and permitting the use of tapered frame side members or sills.

A still further object is the employment of rubber bushings at all bearing points to effectively allow a limited torsional movement and twisting action between the parts and, at the same time, to eliminate the need for lubrication of the bearing surfaces.

A further object is the provision of an axle suspension system in which the force component of the frame load transmitted through the spring means is greatly decreased in comparison with prior suspension systems to thus allow the utilization of a much lighter spring for a given maximum frame load. In other words, only a portion of the frame load is transmitted to the axles through the medium of the spring means.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of the rear end of the vehicle frame showing the new and improved tandem axle suspension system;

Figure 2 is a plan view of the axle suspension system taken substantially along line 2—2 of Figure 1 with the differential load-receiving members associated with the rearward axle removed for the sake of clarity of illustration;

Figure 3 is a detailed view taken substantially along line 3—3 of Figure 1;

Figure 4 is an enlarged, fragmentary view taken substantially along line 4—4 of Figure 1; and Figure 5 is an enlarged, fragmentary view taken substantially along line 5—5 of Figure 1.

Referring to the drawings, in which like reference characters designate like elements throughout the various views, there is shown the rearward portion of a longitudinal chassis or frame 10 comprising a pair of transversely spaced side sill members 11 and 12 which are rigidly interconnected by a pair of longitudinally spaced cross members 13 and 14. The frame 10 is carried on a spring suspension system including a pair of transversely extending parallel supporting axles 15 and 16 which in turn are supported by a plurality of ground engaging wheels 17 and 18, there being two pairs of wheels 17 for the axle 15 and another set 18 for the axle 16. Wheels 17 are shown to be the driving wheels. However, it is to be understood that the rear axle 16 as well as the forward axle 15 may function as a drive axle by the incorporation of suitable power transmission mechanism therein. In other words the suspension system to be described is adaptable for vehicles having two driven or dead axles, or one of each.

In the following description, only one side of the rear portion of the vehicle will be described in detail but it should be understood that the structure described will also appear at the opposite side of the vehicle.

Fastened rigidly to the web portion of each sill member 11 and 12 midway between the axles 15 and 16 are supporting plates 19 and 20. Each plate 19 and 20 is provided with an inwardly projecting cylindrical section 21 which rigidly supports the ends of a transverse hollow tube 22. Referring specifically to the structure disposed along side sill member 11 it will be noted that an aperture 23, aligned transversely with the hollow interior of tube 22, is formed in the web portion of the sill member 11. A supporting pin 24 has one end inserted through aperture 23 into tube 22 and is rigidly secured thereto. The opposite end of the pin 24 projects outwardly of the sill member 11 and constitutes the supporting means for the spring structure to be described hereinafter.

A leaf spring assembly or secondary resilient load-transmitting member, designated generally by numeral 25, is made up of a plurality of leaves 26 of various lengths which are mounted on a saddle 27. The leaves 26 of the assembly are clamped in assembled relation to the saddle 27 midway between their ends by means of inverted U-shaped bolts 28 which surround the spring assembly 25 and whose free ends extend through the saddle flanges and are secured thereto by the nuts 29. The saddle 27 in its assembled condition provides a transversely extending bearing 30 which surrounds the outwardly projecting portion of the pin 24. Interposed between the outer surface of the pin 24 and the inner surface of the bearing 30 is a bushing 31 of elastic flowable material such as rubber. The bushing 31 is nonslidably mounted on the pin and has a metal sleeve 32 secured on its outer surface. The sleeve 32 rigidly engages the interior surface of the bearing 30. It is obvious that the leaf spring assembly 25 is capable of rocking about a transverse horizontal axis corresponding to the longitudinal axis of the pin 24. The utilization of the rubber bushing 31 as described effectively decreases vibration between the spring assembly 25 and the pin 24 and provides a pivotal connection between the parts which does not require external lubrication.

Axle brackets 33 are fixedly mounted by means of inverted U-bolts 35 and nuts 36 on pads 34 of a conventional type formed adjacent the ends of the axles 15 and 16. As best shown in Fig. 1, each axle bracket has an upwardly extending arm 37 and a horizontally extending arm 38. Referring to Fig. 4, it will be noted that the free end of the upwardly extending arm 37 rigidly carries one end 39 of a short, transversely extending pivot pin 40. The opposite end 41 of the pin 40 is provided with a rubber bushing 42 similar to bushing 31 associated with pin 24.

Rigidly secured to the sill member 11 forwardly of the axle 15 is bracket 43 having a downwardly depending portion 44 provided with a transversely extending bearing 45. The horizontally extending arm 38 of each axle bracket 33 has a horizontal, transversely extending aperture therethrough for receiving a pin 46. A bushing 47 of rubber or like material is secured to the pin 46 and is substantially enclosed by a metal sleeve-like retainer, the outer surface of which rigidly engages the bearing surface formed by the aperture extending through the arm 38. It is evident that pin 46 may rotate to a limited extent in the aperture because of the elasticity of the rubber bushing 47. A similar pin 48 is rotatably connected to bearing 45 by means of a rubber bushing 49 and a metal retainer 50 having a channel-shaped cross section, as best shown in Fig. 3. Interconnecting the pins 46 and 48 is a torque arm 51 which includes a pair of parallel links 52, 53 having their ends rigidly connected to pins 46 and 48. A bracket 54, similar to bracket 43, is rigidly connected to the sill member 11 rearwardly of axle 16. Bracket 54 and the axle bracket 33 associated with axle 16 are interconnected by means of exactly the same structure utilized for connecting bracket 43 and the axle bracket 33 associated with axle 15 and, hence, will not be described in detail. It will be appreciated from the foregoing description that the driving and braking forces are effectively taken by the torque arms 51 and furthermore the rubber bushings allow a limited torsional movement and twisting action between the parts generally caused when the wheels on one side of the frame only pass over an irregularity in the terrain. It is also evident that the use of these bushings at all bearing points eliminates the need for lubrication inasmuch as relative rotational movement between the parts entails no frictional sliding of one metal part of another metal part.

Rigidly connected to the frame 10 adjacent each bracket 43 and 54 is a primary load-transmitting member 55. Brackets 55 have a bearing surface 56 formed therein for rotatably receiving one end of pivot pins 57. The end received by the bearing surface is provided with a rubber bushing 58 encircled by a metal sleeve 59 which rigidly engages the bearing surface 56. The pins 57 project outwardly through the sill member 11, as shown in Fig. 3.

A metal sleeve 60 is non-rotatively mounted on the rubber bushing 42 associated with pin 40. A differential load-receiving beam 61 is non-rotatively mounted intermediate its ends 62, 63 upon each metal sleeve 60. The beam 61 is capable of rocking about pin 40 because of the elasticity of the rubber bushing 42 interposed between the parts. One end 62 of each beam 61 is keyed or otherwise rigidly secured to the outwardly projecting portion of each pivot pin 57, as shown in Fig. 3 of the drawings. The opposite ends 63 extend longitudinally toward the supporting pin 24 and have rounded abutment heads 64 which slidingly engage respectively the underside of opposite end portions of the lowermost leaf 26 of the spring assembly 25. It will be noted that the longitudinal distance between pivot pin 57 and pivot pin 40 is greater than the longitudinal distance between pin 40 and the center of the abutment head 64 by approximately 10% of the entire distance between pin 57 and the center of the abutment head 64. The significance of this fact will be explained hereinafter.

Before describing the operation of the axle suspension system described above certain peculiarities inherent in the system will be pointed out. The frame load force is transmitted to the supporting axles 15 and 16 from side sill member 11 from three longitudinally spaced points; namely, the primary load-transmitting member 55 forwardly of the axle 15, the spring assembly 25, and the primary load-transmitting member 55 rearwardly of the axle 16. Inasmuch as these force transmitting points are spaced relatively far apart the frame load is distributed over a greater area to thus permit the use of a lighter, tapered side sill member. Furthermore, only a definite, predetermined amount of the frame load is transmitted to the axles 15 and 16 by the spring assembly 25. The residue of the frame load is transmitted directly to the axles from the primary load-transmitting members 55. Hence, it will thus be obvious that a relatively lighter spring assembly can be used as compared to the spring assemblies utilized in prior suspension systems where the full frame load is transmitted from the frame to the axles solely by the spring assemblies.

Assuming that the wheels 17 and 18 are traveling over comparatively smooth roads upon downward movement of the frame 10 relative to the axles 15 and 16 the primary load-transmitting members 55 and the secondary resilient load-transmitting member 25 move vertically toward the axles causing the differential load-receiving beams 61 to rock about pivot pins 57. Inasmuch as an intermediate portion of each load-receiving beam 61 is pivotally supported by one of the axles, it will be evident that the abutment heads 64 formed on the beams 61 opposite the pivot pins 57 will move vertically upwardly against the yieldable reaction force of the spring assembly 25. When this occurs torsion on the rubber bushings 42, 47, 49 and 58 will be increased. Furthermore, the portions of frame load transferred from the pivot pin 24 to the spring assembly 25 is equally divided between the axles by the spring assembly.

In the event that the wheels 17 on the axle 15 encounter uneven terrain ahead of the wheels 18 on the axle 16, axle 15 will move vertically upwardly carrying with it the intermediate portion of the load-receiving beam 61 associated with the axle 15. Since the beam 61 is pivotally connected to the frame 10 upward movement of the intermediate portion of the beam 61 will cause the abutment head 64 formed thereon to act upwardly against the end of the leaf spring assembly 25 which it abuts and tends to rotate the same in a clockwise direction as viewed in Figure 1 of the drawings. Rotational movement of the spring assembly 25 will in turn cause the opposite end of the assembly to move downwardly against the abutment head 64 formed on the beam 61 associated with the rear axle 16. It will be appreciated that the reaction forces developed in the suspension system when one axle of the tandem set moves relatively to the frame and the other axle are effectively distributed to both axles by the secondary resilient load-receiving member or spring assembly 25. A similar reaction in reverse will occur when the forward wheels 17 level out and the rearward wheels 18 encounter the uneven spot just passed over by the wheels 17 on the axle 15. It is therefore apparent that the wheels may follow uneven or rough surfaces but the load will be distributed onto the respective wheels irrespective of the various positions the axle assembly may assume.

The embodiment of the invention chosen for the purposes of illustration and description herein is that preferred as the result of selective tests based upon requirement for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications as fall within the spirit and scope of the invention as defined in the appended claims.

What is claimed is:

1. In a vehicle having a longitudinal frame and a pair of longitudinally spaced, transversely disposed load supporting axles below said frame, an axle suspension system comprising a pair of longitudinally spaced frame brackets rigidly connected to said frame on one side thereof; a longitudinally disposed spring member spaced between said axles and said brackets, said spring member being pivotally connected to said frame substantially midway between its ends and being rockable about a horizontal axis vertically spaced above said axles; an axle bracket rigidly secured adjacent the ends of said axles, said brackets each having an upwardly extending arm and a horizontally extending arm; a torque arm associated with each axle, said torque arms each having one end pivotally connected to one of said horizontally extending arms and its opposite end pivotally connected to said frame; a differential load-receiving member for each axle on one side of said frame; means pivotally connecting an intermediate portion of each load-receiving member to one of said upwardly extending arms for movement about a transversely extending horizontal axis, said means including a connecting element of elastic flowable material disposed non-slidably between said load-receiving members and said upwardly extending arms, each of said load-receiving members extending to and having a surface slidingly engaging respectively the underside of opposite end portions of said spring member; and means including rubber in torsion pivotally connecting said load-receiving members respectively directly to said frame brackets.

2. In a vehicle having a longitudinal frame and a pair of longitudinally spaced, transversely disposed load-supporting axles below said frame, an axle suspension system comprising a pair of longitudinally spaced brackets rigidly connected to said frame on one side thereof; a leaf spring member spaced between said axles and said brackets; means for pivotally connecting said leaf spring member to said frame for rocking movement about a horizontal axis vertically spaced from said axles, said means including a rubber bushing; a differential load-receiving member for each axle on one side of said frame; means including a rubber bushing pivotally connecting an intermediate portion of each load-receiving member to an axle for movement about a transversely extending, horizontal axis vertically spaced above the axes of said axles, each of said load-receiving members extending to and having a surface slidingly engaging respectively the underside of opposite end portions of said leaf spring member; and means including a rubber in torsion pivotally connecting said load-receiving members respectively directly to said brackets.

3. In a vehicle having a longitudinal frame including a side sill member and a pair of longitudinally spaced transversely disposed axles below the frame, an axle suspension system for one side of said frame including said axles and frame comprising a mounting pin projecting transversely from said sill member; a longitudinally disposed spring member; means pivotally connecting a mid portion of said spring member to said pin for rocking movement about a transverse, horizontal axis; an axle bracket rigidly secured to each axle, said brackets each having an upwardly extending arm and a horizontally extending arm; a torque arm associated with each axle, said torque arms each having one end pivotally connected to one of said horizontally extending arms and its opposite end pivotally connected to said sill member; a load-receiving beam associated with each bracket, said beams having one end pivotally connected directly to said sill member and their opposite, free ends respectively slidably engaging opposite ends of said spring member; and means pivotally connecting an intermediate portion of each load-receiving beam to the upwardly extending arm of its associated bracket for pivotal movement about transversely extending axes.

4. In a vehicle having a longitudinal frame and a pair of longitudinally spaced, transversely disposed load-supporting axles below said frame, an axle suspension system comprising a pair of longitudinally spaced primary load-transmitting members; means for rigidly connecting said primary load-transmitting members to one side of said frame; a secondary resilient load-transmitting member spaced between said axles and said primary load-transmitting members; means for pivotally connecting said secondary resilient load-transmitting member to said frame for rocking movement about a horizontal axis vertically spaced from said axles, said means including a rubber bushing; a differential load-receiving member for each axle on one side of said frame; means including rubber in torsion pivotally connecting an intermediate portion of each load-receiving member to an axle for rocking movement about transversely extending axes vertically spaced from a horizontal plane containing said axles, each of said load-receiving members extending to and having a surface slidingly engaging respectively the underside of opposite end portions of said secondary resilient load-transmitting member; and means including rubber in torsion pivotally connecting said differential load-transmitting members respectively directly to said primary load-transmitting members.

5. In a vehicle having a longitudinal frame and a pair of longitudinally spaced, transversely disposed load-supporting axles below said frame, an axle suspension system comprising a pair of longitudinally spaced primary load-transmitting members on one side of said frame; means for rigidly connecting said primary load-transmitting members to said frame; a secondary resilient load-transmitting member spaced between said axles and said primary load-transmitting members; means for pivotally connecting said secondary resilient load-transmitting member to said frame for rocking movement about a horizontal axis vertically spaced from said axles; a differential load-receiving member for each axle on one side of said frame, said members being pivotally connected to said axles for rocking movement about transversely extending axes vertically spaced from a horizontal plane containing said axles, each of said members extending to and having a surface slidingly engaging respectively opposite end portions of said secondary resilient load-transmitting member; and means pivotally connecting said differential load-transmitting members respectively directly to said primary load-transmitting members.

6. In a vehicle having a longitudinal frame and a pair of longitudinally spaced, transversely disposed load-supporting axles below said frame an axle suspension system including said frame and axles comprising a pair of longitudinally spaced primary load-transmitting members on one side of said frame; a secondary resilient load-transmitting member spaced between said axles and said primary load-transmitting members; a differential load-receiving member for each axle, said members being pivotally supported by said axles for rocking movement about a transversely extending axis vertically spaced from a horizontal plane containing said axles, each of said members having a surface slidingly engaging respectively opposite end portions of said secondary resilient load-transmitting member; means connecting said differential load-receiving members respectively directly to said primary load-transmitting members; said secondary resilient load-transmitting member being capable of dividing the frame load received thereby equally to said differential load-receiving members.

7. In a vehicle having a longitudinal frame and a pair of parallel axles transversely of and below the frame, an axle suspension system comprising a longitudinally disposed resilient member having a mid portion pivotally connected to said frame, said member being adapted to rock about a transverse, horizontal axis spaced between said axles; a pair of load receiving members, each of said members having one end pivotally connected directly to said frame on one side thereof and an intermediate portion pivotally connected to an axle, said members being adapted to pivot about horizontal, transversely extending axes; said load-receiving members having their free ends slidingly engaging respectively opposite ends of said resilient member.

8. In a vehicle having a longitudinal frame and a pair of parallel axles transversely of and below the frame, an axle suspension system comprising a longitudinally disposed resilient member having a mid portion pivotally connected to said frame adapted to rock about a transverse, horizontal axis spaced between said axles; a pair of load-receiving members; bracket means including rubber in torsion pivotally connecting one end of each of the load-receiving members directly to said frame on one side thereof; means including rubber in torsion pivotally connecting an intermediate portion of each load-receiving member to an axle, each of said load-receiving members being adapted to pivot about a horizontal, transversely extending axis; said load-receiving members having their free ends slidingly engaging respectively opposite ends of said resilient member; and means including a pair of torque arms connected respectively between each axle and the frame.

9. A vehicle comprising a frame and a pair of axles supporting one end of said frame; a trunnion on said frame spaced between said axles; a resilient load-transmitting member having a mid portion pivoted on said trunnion; a rigid load-receiving beam for each axle on one side of said frame, each load-receiving beam having an intermediate portion pivotally connected to an axle, each of said beams being adapted to rock about a transversely extending axis, said beams having one end pivotally connected directly to said frame and their opposite ends directly engaging respective opposite ends of said load-transmitting member.

10. The combination with a vehicle frame and a pair of axles supporting one end of said frame, of a leaf spring pivotally supported intermediate its ends to the vehicle frame; a pair of rigid load-receiving beams pivotally connected directly to said frame on one side thereof and intermediate their ends to said axles, each of said beams being adapted to rock about a transversely extending axis; said beams having their free ends abutting respectively opposite end portions of said leaf spring.

References Cited in the file of this patent

UNITED STATES PATENTS

| Number | Name | Date |
| --- | --- | --- |
| 820,707 | Downer | May 15, 1906 |
| 1,771,488 | Duesler | July 29, 1930 |
| 1,940,914 | Marcum | Dec. 26, 1933 |
| 2,080,123 | Francis | May 11, 1937 |
| 2,420,843 | Shuey | May 20, 1947 |
| 2,496,428 | Avila | Feb. 7, 1950 |
| 2,644,698 | Thornton | July 7, 1953 |

FOREIGN PATENTS

| Number | Country | Date |
| --- | --- | --- |
| 732,660 | France | Sept. 23, 1932 |